United States Patent
Busisi

[11] Patent Number: 5,406,697
[45] Date of Patent: Apr. 18, 1995

[54] EQUIPMENT AND PLANT FOR THE PRECISION ASSEMBLING OF MECHANICAL COMPONENTS IN MASS-PRODUCTION

[75] Inventor: Iginia Busisi, Milan, Italy
[73] Assignee: SIRA S.p.A, Italy
[21] Appl. No.: 865,310
[22] Filed: Apr. 8, 1992

[30] Foreign Application Priority Data

Apr. 12, 1991 [IT] Italy .................. MI91A1024

[51] Int. Cl.6 ............................................. B23P 21/00
[52] U.S. Cl. ........................................ 29/721; 29/783; 29/824
[58] Field of Search .................. 29/721, 783, 786, 791, 29/793, 822, 823, 824; 414/751, 752

[56] References Cited

U.S. PATENT DOCUMENTS

| | | | |
|---|---|---|---|
| 4,589,184 | 5/1986 | Asano et al. | 29/714 X |
| 4,589,199 | 5/1986 | Ohtaki et al. | 29/714 |
| 4,767,046 | 8/1988 | Kumagai et al. | 29/822 X |
| 4,813,529 | 3/1989 | Kawai et al. | 29/824 X |
| 4,930,213 | 6/1990 | Hayakawa et al. | 29/824 X |
| 5,123,161 | 6/1992 | Kubo et al. | 29/822 X |

FOREIGN PATENT DOCUMENTS

| | | | |
|---|---|---|---|
| 0404038 | 12/1990 | European Pat. Off. | 29/824 |
| 0156138 | 9/1982 | Japan | 29/720 |
| 0021571 | 1/1991 | Japan | 29/824 |

*Primary Examiner*—Timothy V. Eley
*Attorney, Agent, or Firm*—Lerner, David, Littenberg, Krumholz & Mentlik

[57] ABSTRACT

An apparatus for assembling mechanical components, and particularly in a mass-production line, includes a fixture to clamp and support the component and a flexible connector for supporting the combined weight of the fixture and the component. The fixture is particularly configured to position the center of gravity of the fixture and the component in substantial vertical alignment with the flexible connector so that the component is oriented for direct assembly to the structure. The apparatus is particularly useful for assembling the components of an automobile, such as the doors, to its body with little or no manual manipulation on the part of a worker.

8 Claims, 3 Drawing Sheets

EQUIPMENT AND PLANT FOR THE PRECISION ASSEMBLING OF MECHANICAL COMPONENTS IN MASS-PRODUCTION

BACKGROUND OF THE INVENTION

FIELD OF THE INVENTION

The present invention concerns an apparatus for the handling and the precision assembling of mechanical components in mass-production, specially of motor-vehicles.

More particularly, the invention concerns an apparatus for assembling heavy components, such as doors in mass-production of cars, lorries and motor-vehicles in general. As it is known, a priority objective in mass-production, such as the production of motor-vehicles on an assembly line, is the reduction of the percentage of manual work needed by using robotized systems.

However it was observed that this solution has given positive results only in some applications, such as for example in the welding of the different components of a car body, while it proved not to be applicable where the precision assembling of mechanical components, as for instance doors, is required. In such a case, in fact, if the housing seat of the component is positioned with even a small deviation with respect to the position programmed for the robot, the latter no longer succeeds mounting the component into its relevant seat, sometimes even seriously damaging it.

In particular, it was noticed that the robotization of the mounting of doors on the body of motor-vehicles gives rise to a rejection percentage accounting for even 50%, thus necessarily involving a manual intervention in this operation. In case of components of high weight, such as specifically the car doors, systems of support and transport were developed essentially consisting of a rigid arm hanging from track-sliding means and provided with the possibility of translating in the space along three directions perpendicular to each other, as well as of oscillating about one or more axes.

The major disadvantage of this device is given by its rigidity and dimensions which involve a considerable inertia in its translation, thus complicating the small movements to adjust the piece positioning in a precision assembly process.

This being said, an object of the present invention is that of solving the aforesaid problems by means of an apparatus that makes the precision assembly of mechanical components in mass-production simple and easy.

A further object of the invention is to provide a plant for the assembly of doors of motor-vehicles in an assembly line.

OBJECTS OF THE INVENTION

Said objects are achieved by means of the invention, which concerns an apparatus for assembling mechanical components, specially motor-vehicles doors, in a line of mass-production, characterized in that it comprises: a device to set to zero the weight of said components and a fixture to controllably support and clamp said components, said supporting and clamping fixture being constrained to said zero weight setting device by at least a cable or similar flexible element.

SUMMARY OF THE INVENTION

The invention moreover concerns a plant for assembling motor-vehicle doors in a line of mass-production characterized in that it presents, in correspondence to each assembly station, at least an apparatus of the afore described type.

According to an advantageous feature of the invention, the center or gravity of the mechanical component mounted on the supporting and clamping fixture is substantially aligned with the axis of the flexible element, so as to position the component in the optimal arrangement for being assembled.

According to a further particularly advantageous feature of the invention, the supporting and clamping fixture is provided with a central body hanging from said flexible element, with one or more interchangeable or adjustable arms supporting and engaging said mechanical component and with one or more elements temporarily and controllably clamping the component itself.

A considerable flexibility of application and use of the apparatus according to the invention is thus obtained, its structure being possibly modified as a function of the type of component to be handled.

The invention now will be described in more detail with reference to the accompanying drawings given with illustrative and not limiting purposes, where:

DESCRIPTION OF THE PREFERRED EMBODIMENTS

Figure 1:
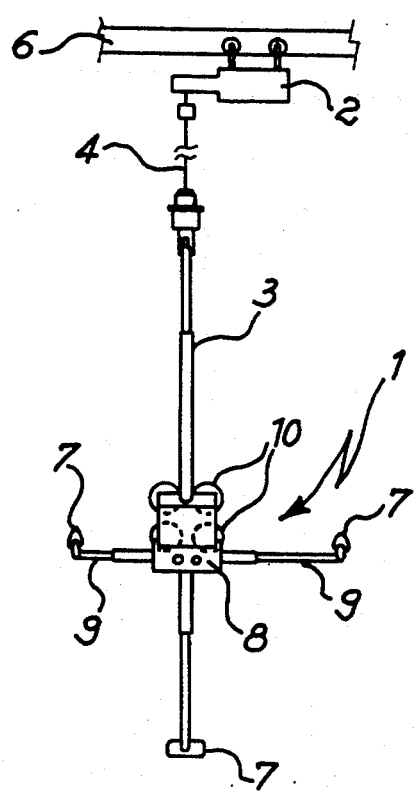
FIG. 1 is a plan schematic view of an apparatus according to the invention.

With reference to FIG. 1, the apparatus 1 according to the invention comprises a device 2 for the zero setting of the weight, of a type known per se in the technique, a fixture 3 to support and clamp the mechanical components, in particular doors of motor-vehicles, and a cable 4 or similar flexible means controllably constraining the fixture 3 to the device 2.

Figure 3:
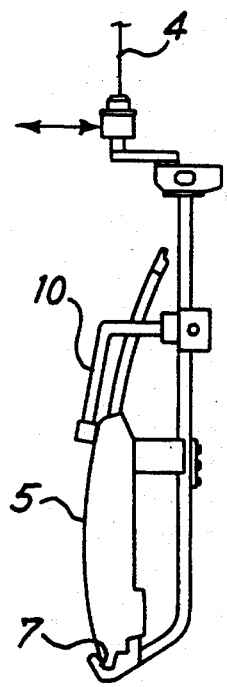
FIGS. 3 and 4 are front and side views of a second apparatus of the invention during operation.
Figure 4:
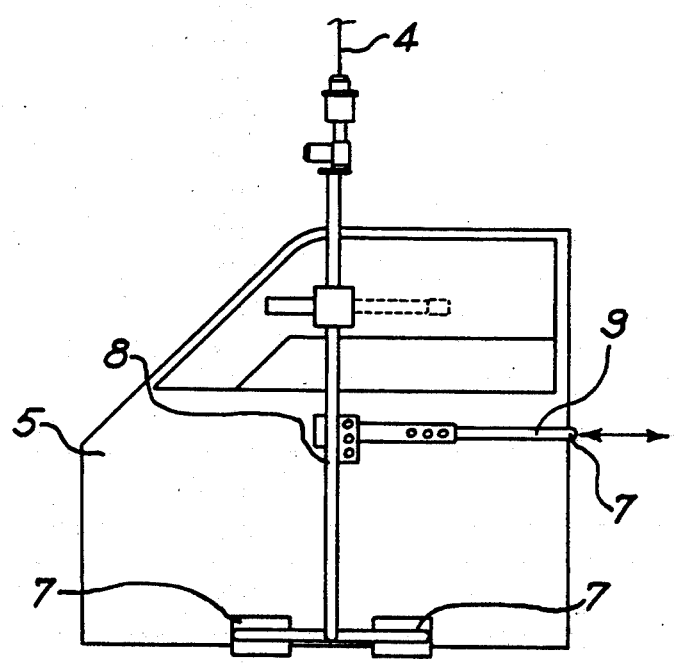

As better visible in FIGS. 3 and 4, where the mechanical component consists of a door 5 for a motor-vehicle, the fixture is sized not only as a function of the component shape, but also of its center of gravity. In other words, the fixture 3 accomodates the door 5 ( or other mechanical component) in a way that its center of gravity is substantially aligned with the axis of the flexible element 4 and in a way that it is positioned with an orientation in space appropriate for its assembly, limiting the intervention of the operator only to small adjustments.

In this way the component 5 to be handled will always result correctly positioned and easily handled, even if fastened to the device 2 only by means of the cable 4. This correct positioning is particularly useful since, in the preferential embodiment of the invention, the device 2 is accomodated on hanging means 6 and is freely movable along them in one* or more horizontal directions. Preferably said means 6 are constituted by tracks or suspension rails.

To check if the component 5 is actually positioned in the aforedescribed way, the fixture 3 is provided with a plurality of sensors 7 placed in preset positions, that verify the presence of the component 5 in correspondence to each of them.

Preferably, the operation startup of the apparatus is dependent on the consent of said sensors; in other words, the zero setting of the weight performed by the device 2 and the clamping of the component 5 by the fixture 3 can take place only if all the sensors 7 have detected the presence of the component 5 in their correspondence. For a better flexibility of use, the fixture 3 generally comprises a central body 8, fixable to the cable 4, on which one or more interchangeable and/or adjustable arms 9 are mounted to support and engage the component 5, as well as one or more elements 10 to temporarily and controllably clamp said components and the operating controls of the apparatus.

Figure 2:
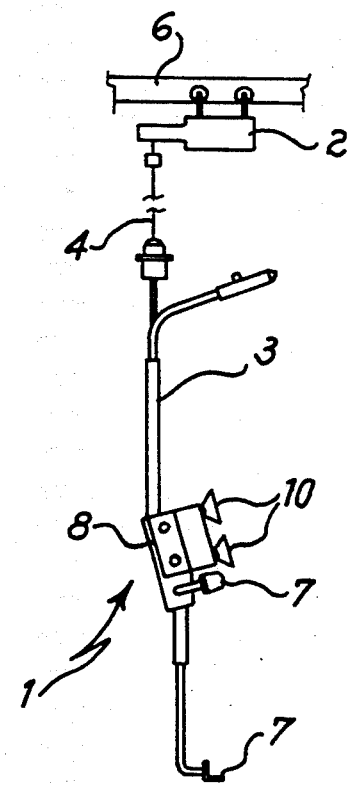
FIG. 2 is a side view of the apparatus of FIG. 1.

The clamping elements 10 are controlled in a known way by a plurality of controls preferably positioned on the central body 8 and can be of mechanical type, as in the embodiment of FIGS. 3 and 4, or of pneumatic type, as in the embodiment of FIG. 1 and 2.

In the latter case, particularly suitable to handle motor-vehicle doors with raised windows, the elements 10 consist of a plurality of suction cups or similar pneumatic locking means.

Figure 5:
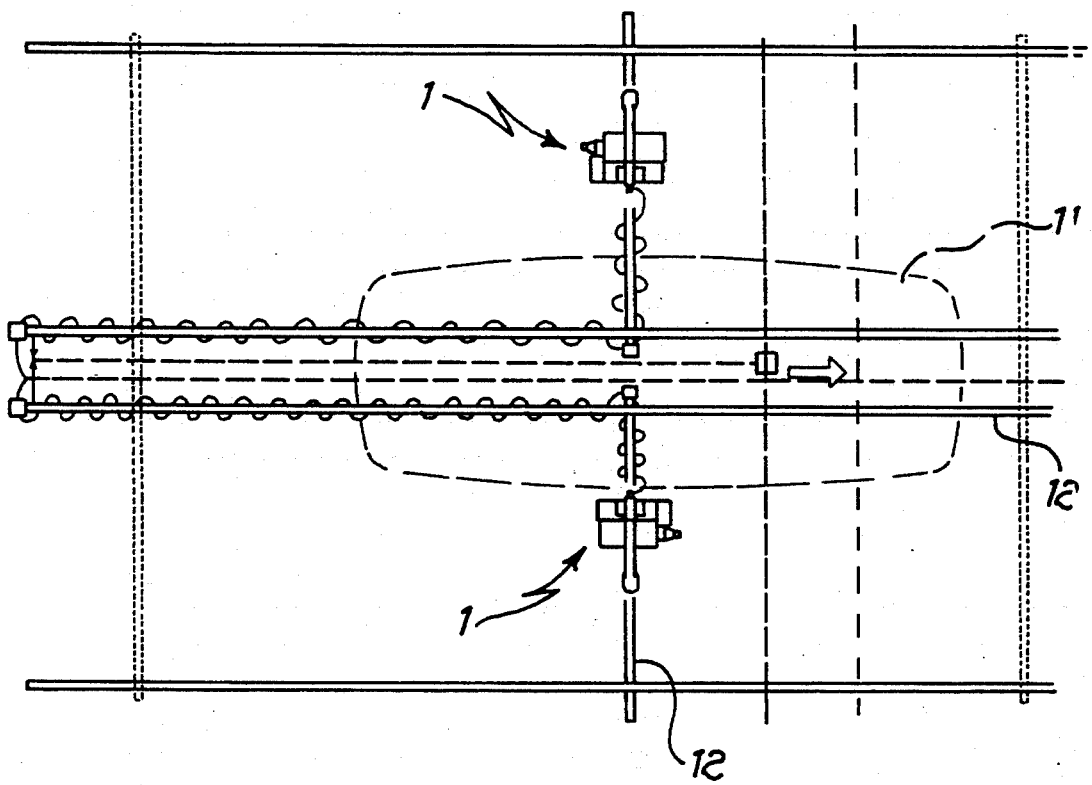
FIGS. 5 and 6 are plan and side views of part of an apparatus according to the invention.
Figure 6:
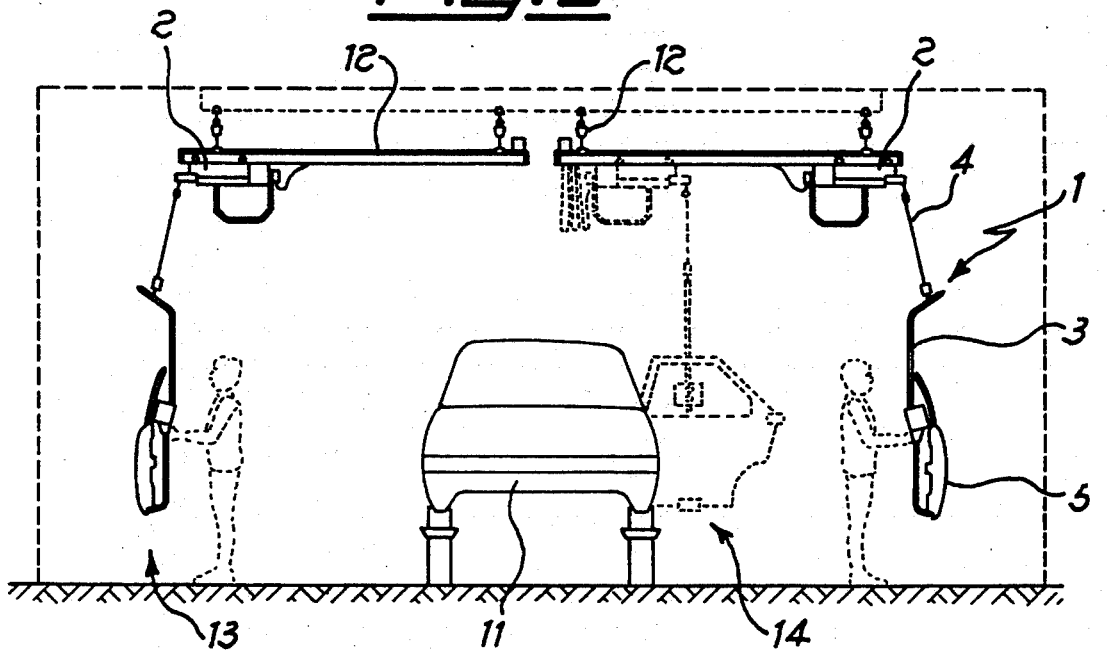

FIGS. 5 and 6 schematically illustrate the disposition of the apparatus according to the invention in a station of a plant for the assembly of motor-vehicle doors in a mass-production line.

Figure 7:
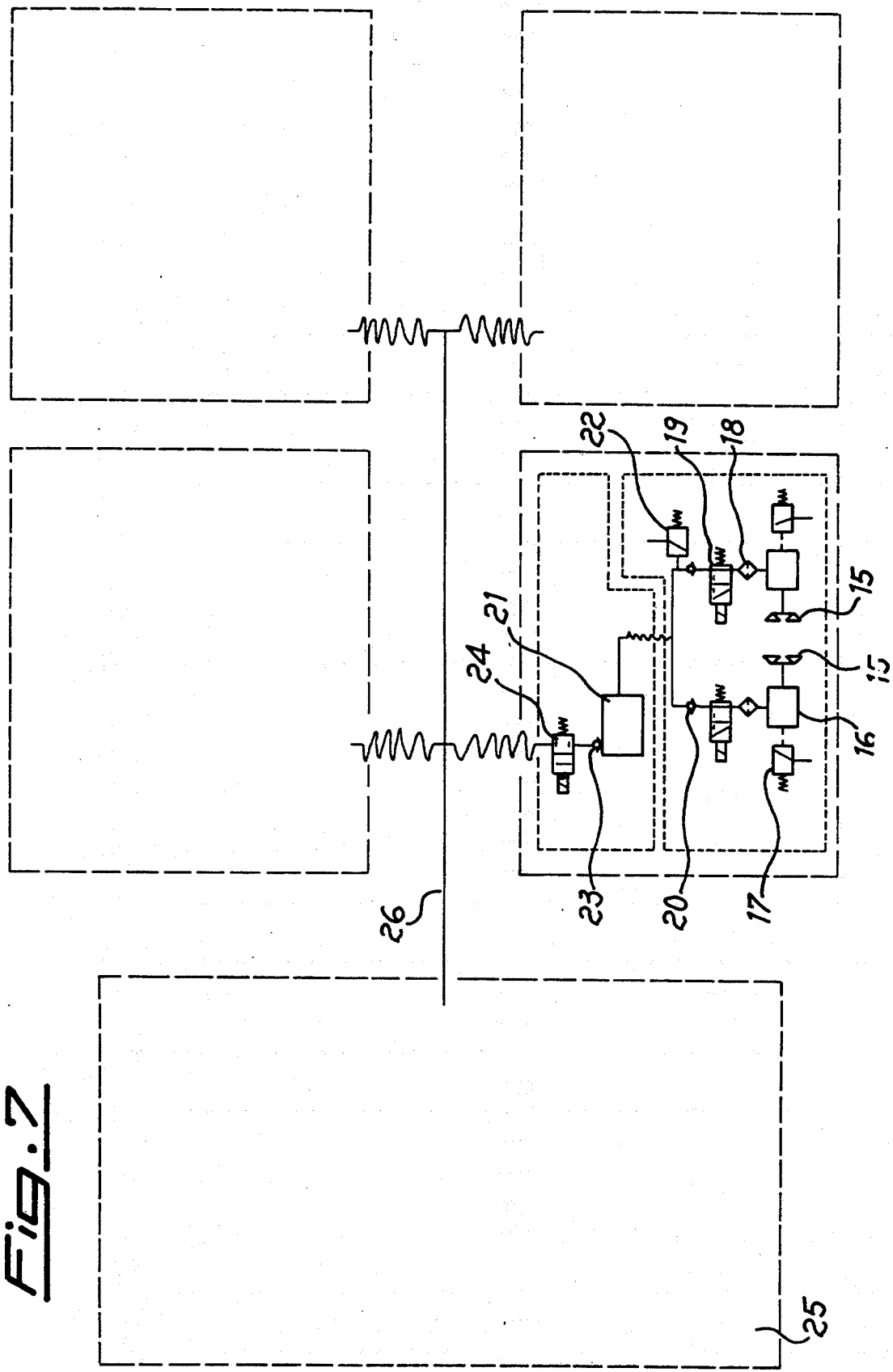
FIG. 7 is a diagram of a vacuum pneumatic circuit in a plant according to the invention.

As it can be noted, the assembly station comprises two apparatus 1 arranged on opposite sides of a motor-vehicle 11 and movable along hanging tracks 12 in two directions substantially orthogonal to each other, in a way to be able to move from a position 13, where the door is received, to a position 14 for assembly on the vehicle 11, where the apparatus and door are shown with dashed lines. FIG. 7 schematically shows a vacuum circuit used in a plant according to the invention, in case of apparatus using suction cups or similar pneumatic clamping; for clarity's sake in the drawing the components have been outlined for one apparatus only.

In the preferential embodiment shown in such diagram, each apparatus is provided with four suction cups 15, that are connected two by two to a relevant small tank 16 provided with a vacuostat 17. On its turn the small tank 16 is connected through a filter 18, an electrovalve 19 of the normally open type and a check valve 20 to a main tank 21 serving the whole apparatus. A further vacuostat 22 is placed on the common duct leading to the tank 21.

The splitting of the plant to separately serve two suction cups at a time allows the door to remain fastened even in case of vacuum loss in a point of the plant downstream from the tank 21. Vacuostats in this case give alarm signals.

The tank 21 is on its turn connected to the vacuum pumps unit 25 by means of a check valve 2S and a normally closed electrovalve 24.

A further vacuostat (not shown) mounted on the common line 26 connecting the vacuum pumps unit 25 controls the tightness of the latter and of the line During operation, a door 5 is conveyed to the position 13 of an assembly station, where the operator carries an apparatus 1.

After correctly mounting the door 5 on the fixture 3 and receiving the consent of the sensors 7, the operator actuates the controls to clamp the door on the fixture 3 (for instances by suction cups 15) and to set to zero the weight of the same by means of the device Then the door is brought to the assembly position 14, where thanks to small adjustments it is correctly accomodated in the corresponding seat of the motor-vehicle 11 and fastened therein.

I claim:

1. An apparatus for assembling a mechanical component to a structure, the component having a predetermined orientation with respect to the structure in assembled position, the apparatus comprising
    fixture means for clamping and supporting the component,
    a single flexible connector for supporting the combined weight of said fixture means and the component, and
    means on said fixture means for positioning a center of gravity of said fixture means and the component in substantial vertical alignment with said flexible connector so that the component is oriented substantially in said predetermined orientation.

2. An apparatus as claimed in claim 1, wherein said flexible connector is connected to guide means for moving said fixture means in horizontal directions.

3. The apparatus as claimed in claim 1, wherein said fixture means includes sensors for sensing the position of the component on said fixture means.

4. The apparatus as claimed in claim 1, wherein said fixture means includes a central frame, at least one arm movable with respect to said central frame for engaging the component, and locking means for securing the component to said fixture means.

5. The apparatus as claimed in claim 4, wherein said locking means includes means for applying a suction force to the component.

6. A manufacturing facility for assembling mechanical components to a structure, each of the components having a predetermined orientation with respect to the structure in assembled position, said facility comprising
    a plurality of assembly stations, each one of said assembly stations including fixture means for clamping and supporting one of the components, a single flexible connector for supporting the combined weight of said fixture means and the one component, and means on said fixture means for positioning a center of gravity of said fixture means and the one component in substantial vertical alignment with said flexible connector so that the one component is in said predetermined orientation.

7. The manufacturing facility as claimed in claim 6, wherein each of said flexible connector is connected to guide means for guiding the movement of said fixture means in orthogonal horizontal directions.

8. The manufacturing facility as claimed in claim 6, wherein each one of said fixture means further includes locking means for holding the one component to said fixture means, said locking means including a plurality of suction devices for applying a suction force to the one component, a first portion of said plurality of suction devices being connected through a first check valve to a first vacuum tank and a second portion of said plurality of suction devices being connected through a second check valve to a second vacuum tank, and wherein said manufacturing facility further includes at least one vacuum pump operably connected to said first and second vacuum tanks for creating said suction force.

* * * * *

UNITED STATES PATENT AND TRADEMARK OFFICE
CERTIFICATE OF CORRECTION

PATENT NO. : 5,406,697
DATED : April 18, 1995
INVENTOR(S) : Busisi

It is certified that error appears in the above-identified patent and that said Letters Patent is hereby corrected as shown below:

On cover page under Foreign Application Priority Data, "MI91A1024" should read --MI91A001024--.

Column 1, line 24, "assembling-of" should read --assembling of--.

Column 1, line 56, after "for" insert --the--.

Column 1, line 56, after "assembling" insert --of--.

Column 2, line 63, "one*" should read --one--.

Column 3, line 57, "2S" should read --23--.

Column 3, line 61, after "line" insert --26.--

Column 4, line 2, after "device" insert --2.--.

Signed and Sealed this

Eighteenth Day of July, 1995

Attest:

BRUCE LEHMAN

*Attesting Officer*  *Commissioner of Patents and Trademarks*